US008464909B2

(12) United States Patent
Delande et al.

(10) Patent No.: US 8,464,909 B2
(45) Date of Patent: Jun. 18, 2013

(54) DISPENSING SYSTEM FOR FOOD PRODUCTS (75) Inventors: Bruno Sadi Henri Delande, Marseille en Beauvaisis (FR); Bruce Funnell, Bailleul-sur-Therain (FR)

(73) Assignee: Nestec S.A., Vevey (CH)

( * ) Notice: Subject to any disclaimer, the term of this patent is extended or adjusted under 35 U.S.C. 154(b) by 335 days.

(21) Appl. No.: 12/741,728

(22) PCT Filed: Nov. 3, 2008

(86) PCT No.: PCT/EP2008/064855
§ 371 (c)(1),
(2), (4) Date: Jul. 12, 2010

(87) PCT Pub. No.: WO2009/059942
PCT Pub. Date: May 14, 2009

(65) Prior Publication Data
US 2011/0024445 A1 Feb. 3, 2011

(30) Foreign Application Priority Data
Nov. 7, 2007 (EP) ..................... 07120148

(51) Int. Cl.
*B65D 35/28* (2006.01)
(52) U.S. Cl.
USPC ............................. 222/103; 222/95; 222/105
(58) Field of Classification Search
USPC ................... 222/103, 95, 105, 146.6, 1, 527, 222/529, 536–537, 213–214; 53/530, 434–436, 53/469, 486, 514, 518, 523, 526, 527, 528, 53/529; 426/512, 516, 517, 389, 392, 413, 426/115, 130, 232, 393; 141/81, 114, 71, 141/251–258, 270, 262, 263, 269, 275, 276, 141/284; 425/269, 302.1, 122
See application file for complete search history.

(56) References Cited

U.S. PATENT DOCUMENTS
3,308,898 A * 3/1967 Allen et al. ..................... 177/64
4,042,153 A * 8/1977 Callahan et al. .............. 222/207
(Continued)

FOREIGN PATENT DOCUMENTS
EP 1650133 A1 4/2006
JP 07327608 A * 12/1995
JP 2001-095495 4/2001

OTHER PUBLICATIONS
Written Opinion, PCT/EP2008/064855, mailed Feb. 19, 2009.
International Search Report, PCT/EP2008/064855, mailed Feb. 19, 2009.

*Primary Examiner* — Kevin P Shaver
*Assistant Examiner* — Christopher Luzecky
(74) *Attorney, Agent, or Firm* — K&L Gates LLP (57) ABSTRACT

A dispensing device for a viscous edible product, with a storing unit for storing the viscous product, and a dispensing unit. The dispensing unit includes a flexible packing tube for packing and dispensing the food product, disposed within the dispensing unit such that it comprises a substantially linear portion adjacent its dispensing opening, compression components for pinching said linear portion of tube, compression components being movable in substantially perpendicular and parallel directions relative to the longitudinal axis of the tube, actuation components for reversibly moving said compression components firstly in a direction substantially perpendicular to the longitudinal axis of the packing tube to releasably pinch at least one portion of the flexible tube, and secondly in a direction parallel to the longitudinal axis of the tube towards its dispensing opening, so as to dispense at least one portion of the product packed in the tube.

16 Claims, 6 Drawing Sheets

U.S. PATENT DOCUMENTS

| | | | | |
|---|---|---|---|---|
| 4,529,106 A * | 7/1985 | Broadfoot et al. | | 222/207 |
| 4,702,675 A * | 10/1987 | Aldrovandi et al. | | 417/63 |
| 4,728,501 A * | 3/1988 | Atake | | 422/509 |
| 4,762,483 A * | 8/1988 | Zevlakis | | 425/140 |
| 4,830,864 A * | 5/1989 | Zevlakis | | 426/393 |
| 5,020,698 A * | 6/1991 | Crossley | | 222/386 |
| 5,048,724 A * | 9/1991 | Thomas | | 222/95 |
| 5,069,364 A * | 12/1991 | McGill | | 222/95 |
| 5,215,215 A * | 6/1993 | Sauer | | 222/1 |
| 5,215,222 A * | 6/1993 | McGill | | 222/94 |
| 5,232,027 A * | 8/1993 | Tanaka et al. | | 141/270 |
| 5,281,429 A | 1/1994 | Zevlakis | | |
| 5,405,054 A * | 4/1995 | Thomas | | 222/95 |
| 5,421,484 A * | 6/1995 | Beach | | 222/95 |
| 5,453,246 A * | 9/1995 | Nakayama et al. | | 422/63 |
| 5,494,194 A * | 2/1996 | Topper et al. | | 222/146.6 |
| 5,505,336 A * | 4/1996 | Montgomery et al. | | 222/82 |
| 5,553,756 A * | 9/1996 | Topper et al. | | 222/496 |
| 5,556,268 A * | 9/1996 | Topper et al. | | 417/553 |
| 5,623,106 A * | 4/1997 | Shaw | | 73/864.14 |
| 5,775,533 A * | 7/1998 | Schroeder | | 222/95 |
| 5,967,381 A * | 10/1999 | van Zeeland et al. | | 222/325 |
| 6,155,461 A * | 12/2000 | Ishihara et al. | | 222/146.6 |
| 6,299,025 B1 * | 10/2001 | Watanabe et al. | | 222/146.6 |
| 6,319,532 B1 * | 11/2001 | Pineault | | 426/516 |
| 6,325,244 B2 * | 12/2001 | Vincent et al. | | 222/1 |
| 6,435,377 B1 * | 8/2002 | Iwata et al. | | 222/397 |
| 6,453,803 B1 * | 9/2002 | Sodeyama et al. | | 99/348 |
| 7,651,010 B2 * | 1/2010 | Orzech et al. | | 222/214 |
| 7,665,630 B2 * | 2/2010 | McGill | | 222/1 |
| 7,784,423 B1 * | 8/2010 | Logsdon | | 118/300 |
| 8,011,505 B2 * | 9/2011 | Murray et al. | | 206/364 |
| 2005/0189375 A1 | 9/2005 | McGill | | |
| 2007/0275131 A1 * | 11/2007 | Bertini et al. | | 426/115 |
| 2011/0024445 A1 * | 2/2011 | Delande et al. | | 222/1 |
| 2011/0079615 A1 * | 4/2011 | Ophardt et al. | | 222/181.3 |

* cited by examiner

DISPENSING SYSTEM FOR FOOD PRODUCTS

The present invention concerns a dispensing system for food products, more particularly, a dispensing system for viscous food products such as soft ice cream.

In the following description, it is supposed that the viscous food product is soft ice cream. However, this is merely an example of a product that can be dispensed from the dispensing device according to the present invention Dispensers for viscous edible products such as for instance soft ice cream exist which typically comprise a storage cabinet (closed room) into which a package containing the soft ice cream is stored at freezing temperature. Such dispensers also comprise a system to transfer the ice cream from the storage cabinet to a delivery spout, from which the product is dispensed as a portion to the consumer (into a cup, cone or similar receptacle).

While reliable and widely used, such dispensers have been found to pose practical problems like problems of hygiene (due to the fact that the package containing the product to dispense is kept unchanged and contains the whole remaining product all along its shelf life, bacteria can grow onto surfaces of the said package in the portion of the latter which is emptied). Other problems are known, like the storage volume which is important for big containers. The main problem is certainly the volume of containers that have to be disposed of when completely empty.

Given the above disadvantages of the existing dispensing devices, it is an object of the present invention to provide a dispensing device for viscous, edible products, such as for instance soft ice cream, which is compact, and uses a package for storing and dispensing the product, which is also compact, especially when emptied, hygienic, and easily disposable when empty.

The purposes of the invention as described hereinbefore, are met by a dispensing device for a viscous edible product, comprising a storing unit for storing the said viscous product, and a dispensing unit.

More particularly and according to the present invention, said dispensing device is characterized in that the dispensing unit comprises:

(i) at least one flexible packaging tube defining at least one cavity for packaging and dispensing said food product, disposed within said dispensing unit such that it comprises a substantially linear portion adjacent its dispensing opening, (ii) compression means for pinching said linear portion of tube, said means being movable in substantially perpendicular and parallel directions relative to the longitudinal axis of the tube, (iii) actuation means suitable for reversibly moving said compression means firstly in a direction substantially perpendicular to the longitudinal axis of the packaging tube to releasably pinch at least one portion of said flexible tube, and secondly in a direction parallel to the longitudinal axis of the tube towards its dispensing opening, so as to dispense at least one portion of the product packed in the tube.

In a highly preferred embodiment of the present invention, the pinching means comprises at least upper and lower pairs of jaws.

Preferably, each jaw of said upper pair of jaws comprises a surface of contact with the packaging tube which is cylindrical, and disposed such that when said pair of jaws is in the closed configuration, the contact surface between the two jaws is linear and directed substantially in a transverse direction relative to the longitudinal direction of the packaging tube.

Also preferably, each jaw of said lower pair of jaws comprises a surface of contact with the packaging tube which is cylindrical, and disposed such that when said pair of jaws is in the closed configuration, both jaws form a closed cylinder around said packaging tube, said cylinder having substantially the diameter of the packaging tube.

Advantageously, said storing unit is a closed chamber comprising temperature-regulated freezing means for storing said product at a temperature comprised between −5° C. and −35° C., preferably a temperature comprised between −15° C. and −25° C., and more preferably a temperature of −18° C.

In a highly preferred embodiment of invention, the packaging tube is disposed within the storing unit of said dispensing device, in a coiled configuration.

In another aspect, the present invention is also directed to a package for storing and dispensing a viscous edible product that is suitable for being stored in the storing unit of a dispensing system according to the aforementioned characteristics, characterized in that said package is a flexible tube made of food-grade material.

Preferably, the packaging according to the present invention comprises a rigid spout onto which the dispensing end of said tube is connected.

Also preferably, the rigid spout comprises an elongated rigid tube portion around which the emptied portion of said tube is stored after dispensing.

Advantageously, the length of the flexible tube is comprised between 0.5 and 20 meters.

In a highly preferred embodiment of the present invention, the package is a one-use disposable package suitable for being removably stored into the dispensing unit of the dispensing device.

In another aspect, the present invention is further directed to a method of dispensing a viscous food product from a dispensing device having features as above described, comprising the steps of, in order:

providing said viscous food product in a flexible packaging tube according to the aforementioned characteristics, placing the dispensing extremity of said flexible packaging tube, such that a substantially linear portion of said tube is created adjacent the dispensing opening of said tube, that is positioned between upper and lower jaws of the compression means of the dispensing device, actuating the compression means so that:

the upper and lower pairs of jaws move in a perpendicular direction relative to the longitudinal axis of the packaging tube, so as to pinch said flexible packaging tube, and then said upper and lower pairs of jaws move in a parallel direction relative to the longitudinal axis of the packaging tube, so that the product contained in the portion of the tube comprised between said upper pair of jaws and the dispensing opening of the tube, is pushed outside through said dispensing opening, actuating said upper and lower pairs of jaws of the compression means, back into their initial position.

Preferably, said storing unit is a closed chamber comprising temperature-regulated freezing means for storing said product at a temperature comprised between −5° C. and −25° C.

Also preferably, the flexible tube package is stored in storing unit, in a coiled configuration.

Finally, it is preferable that the emptied portion of packaging tube is disposed after dispensing around a rigid tubular portion of a dispensing spout connected to the dispensing end of the tube.

Additional features and advantages of the present invention are described in, and will be apparent from the description of the presently preferred embodiments which are set out below with reference to the drawings in which:

Figure 1:
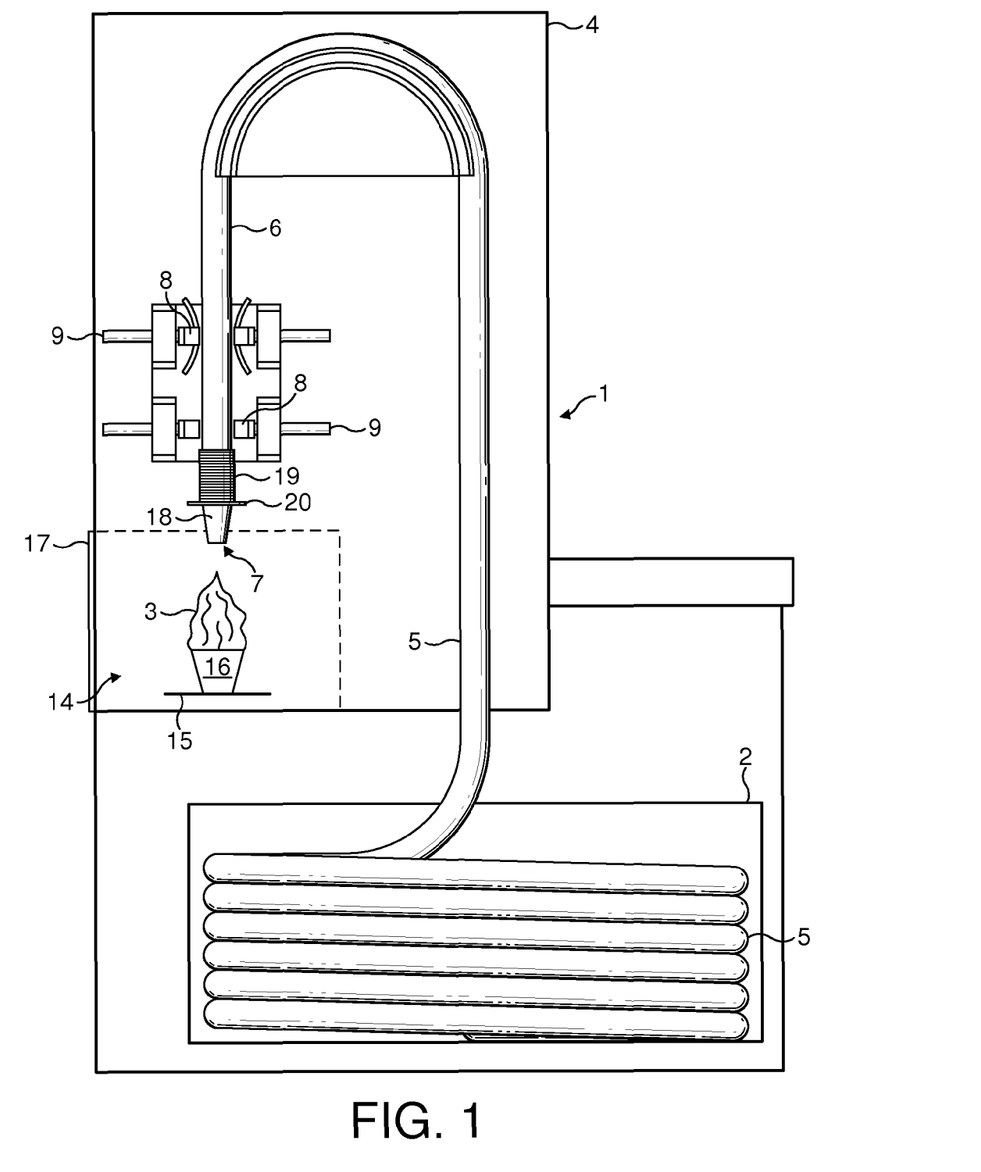
FIG. 1 is a schematic view showing a dispensing device according to the invention.

As illustrated in FIG. 1, the dispensing device 1 according to the present invention comprises a storing unit 2 for storing the said viscous product 3, and a dispensing unit 4.

Figure 4:
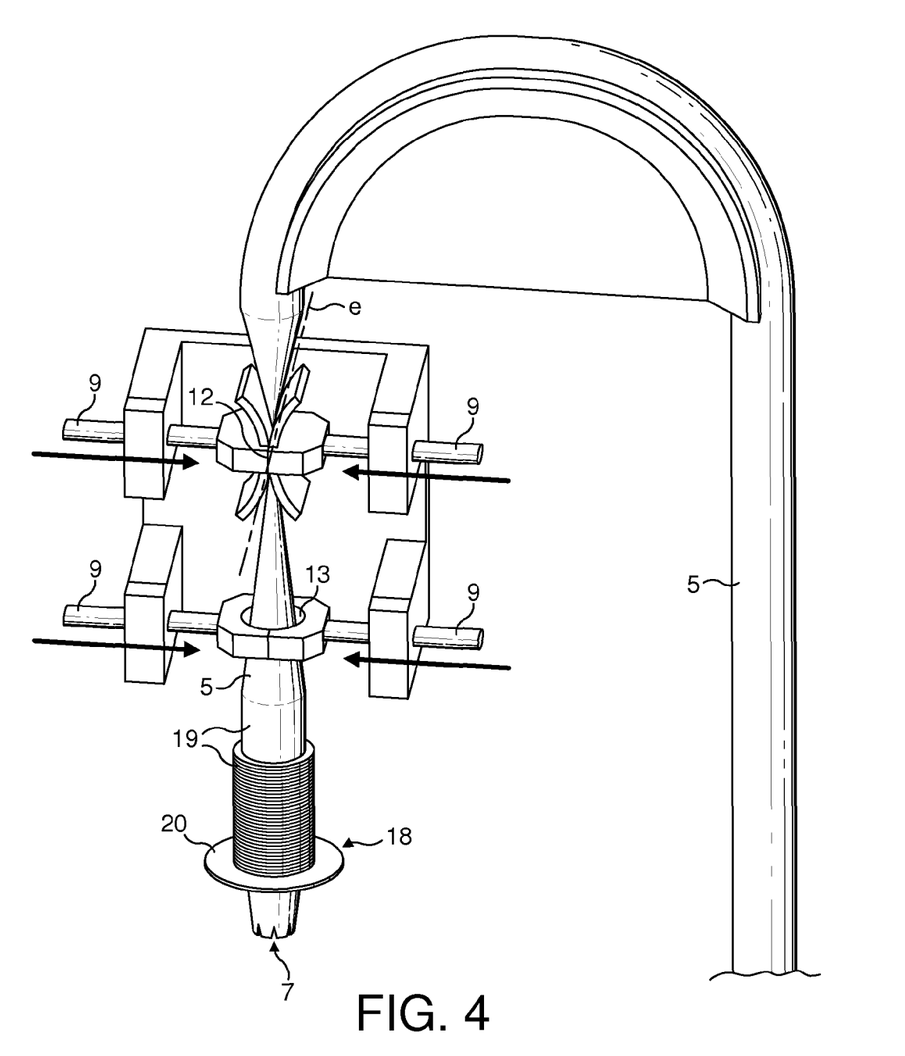
FIG. 4 is a view similar to FIG. 3, wherein the pairs of jaws are in the closed position, pinching the portion of packaging tube disposed in front of them.
Figure 5:
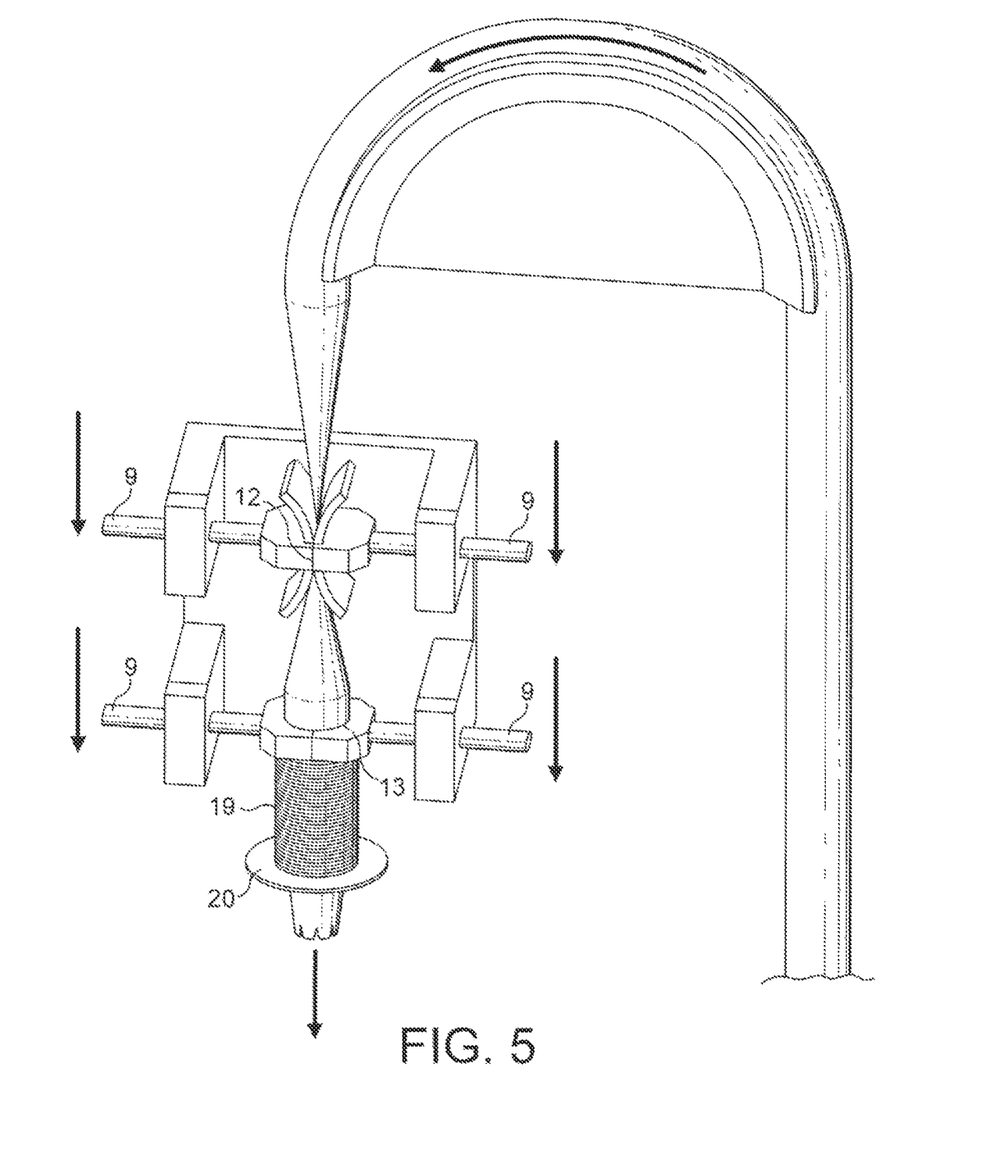
FIG. 5 is a view similar to FIGS. 3 and 4, wherein the pairs of jaws in the closed position move towards the dispensing opening of the packaging tube, thus pressing product out.
Figure 6:
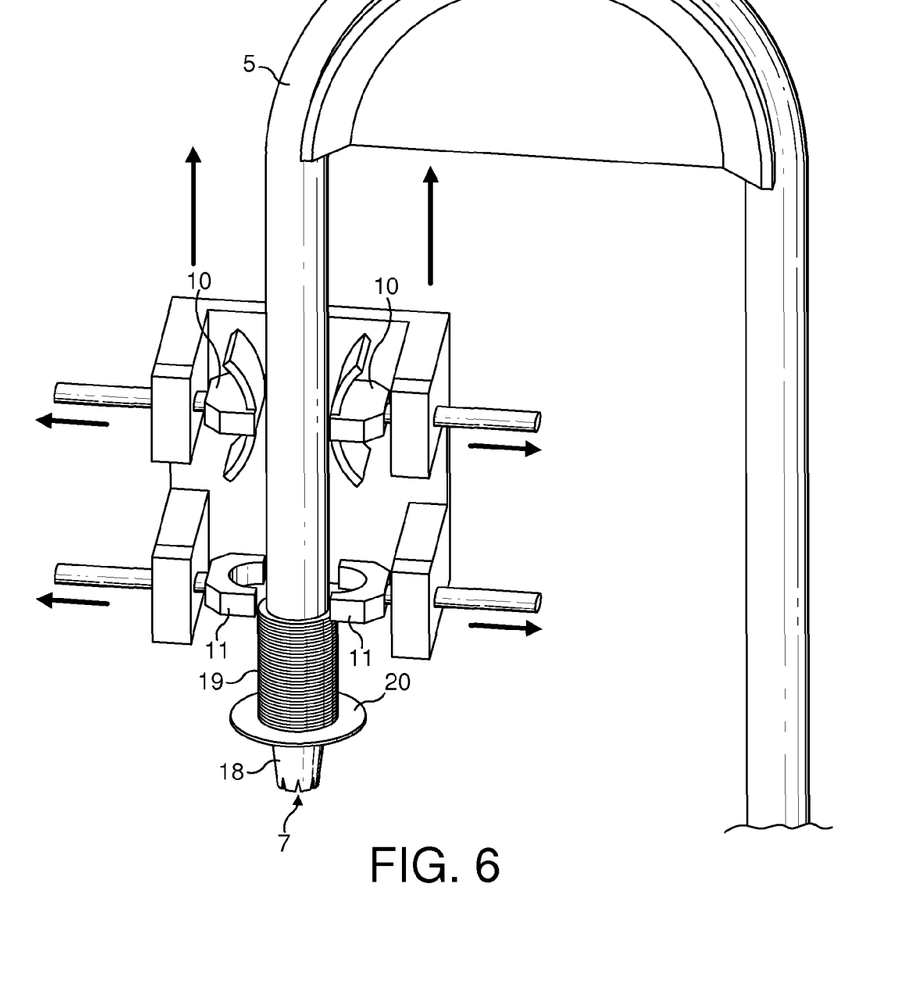
FIG. 6 is a view similar to FIGS. 3 to 5, wherein after the dispensing step, the pairs of upper and lower jaws open to release the packaging tube, and move backwards to their initial position.

More particularly, the dispensing unit 4 comprises:

(i) at least one flexible packaging tube 5 defining at least one cavity for packaging and dispensing said food product 3, disposed within said dispensing unit 4 such that it comprises a substantially linear portion 6 adjacent its dispensing opening 7, (ii) compression means 8 for pinching said linear portion of tube 5, said means 8 being movable in substantially perpendicular and parallel directions relative to the longitudinal axis of the tube 5, (iii) actuation means 9 suitable for reversibly moving said compression means 8 firstly in a direction substantially perpendicular to the longitudinal axis of the packaging tube 5 to releasably pinch at least one portion of said flexible tube 5 (as illustrated in FIG. 4), and secondly in a direction parallel to the longitudinal axis of the tube towards its dispensing opening (as illustrated in FIG. 5), so as to dispense a portion of the product packed in the tube 5.

As illustrated in FIG. 1, the packaging tube 5 is disposed within the storing unit 2 of said dispensing device 1, in a coiled configuration.

Figure 2:
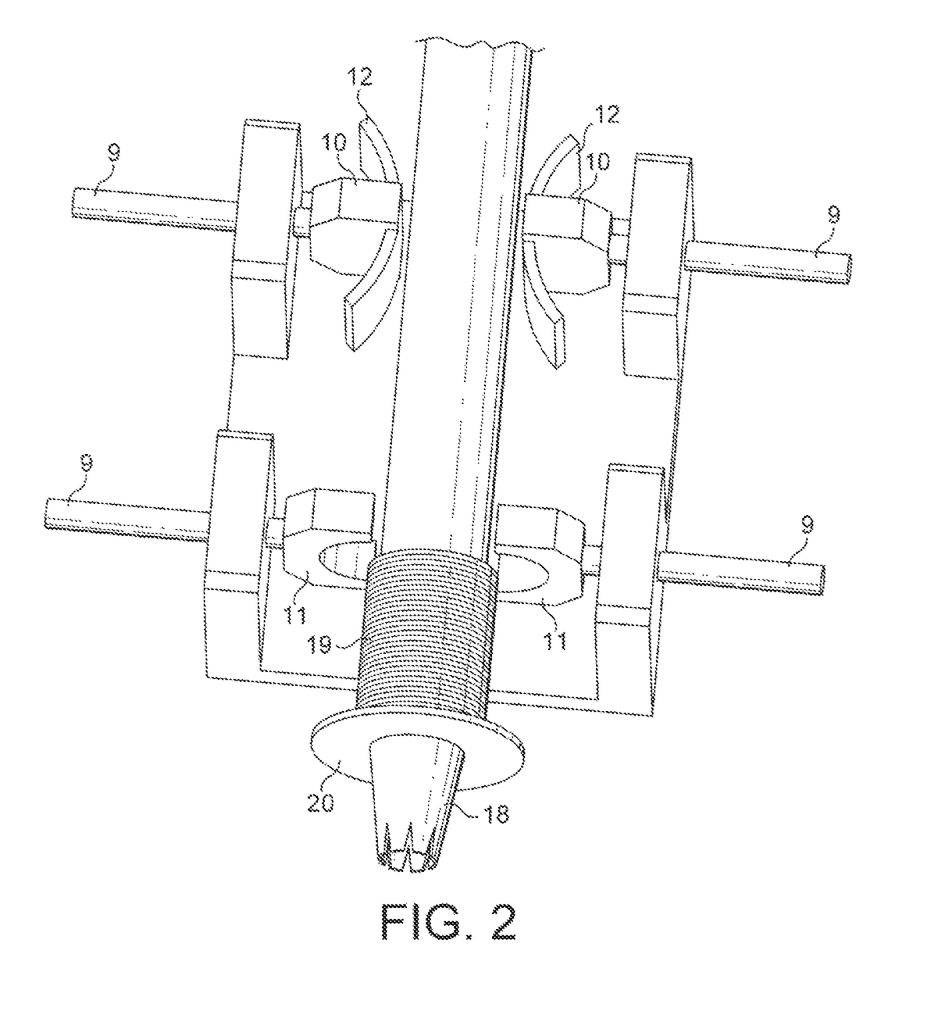
FIG. 2 is a schematic enlarged perspective view of a portion of the packaging tube, and showing the compression pairs of jaws in the open position.
Figure 3:
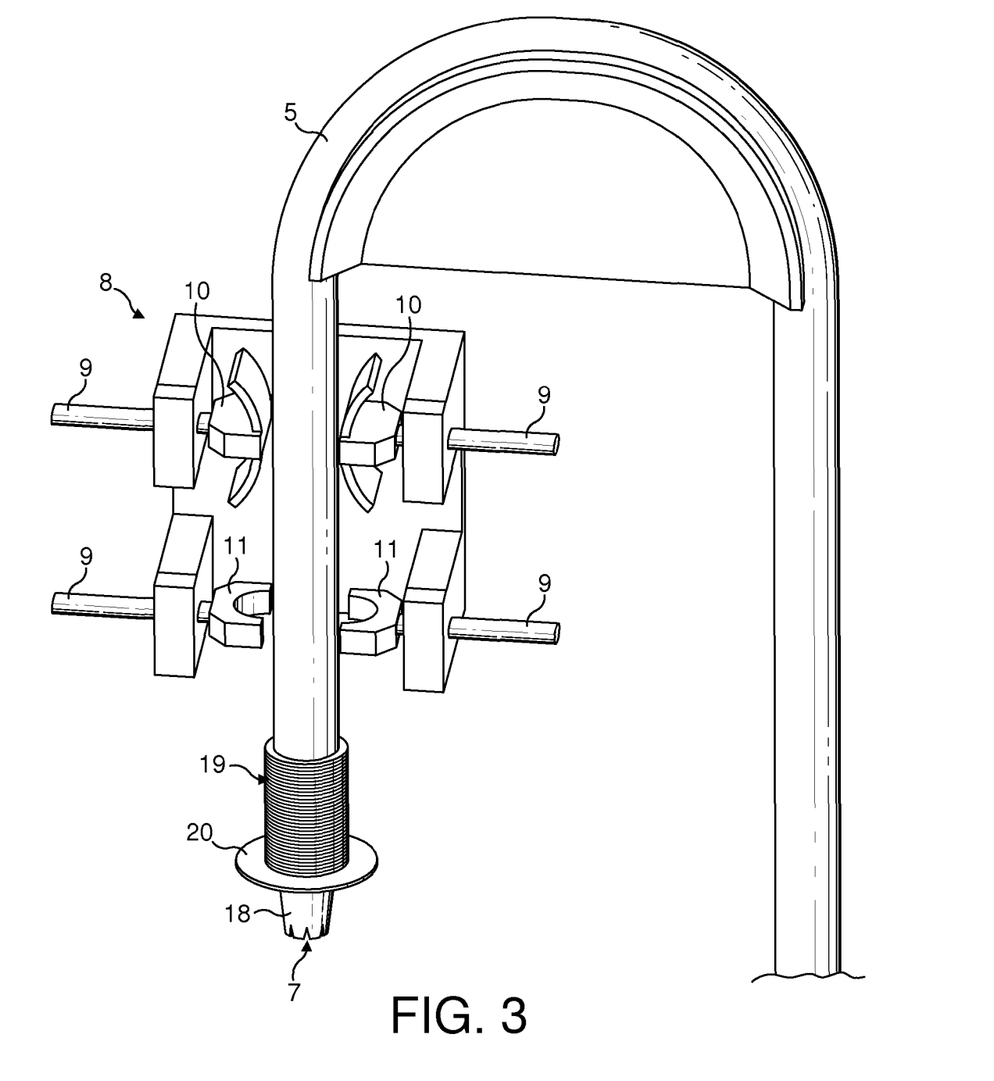
FIG. 3 is a view similar to FIG. 2, showing the pairs of compression jaws in their open configuration.

As shown in FIG. 2, the pinching means comprises upper 10 and lower 11 pairs of jaws.

Each jaw of said upper pair of jaws 10 comprises a surface of contact 12 with the packaging tube 5 which is included into a cylinder with its convexity turned towards the packaging tube placed in between the two jaws as shown in FIG. 2. They are disposed such that when said pair of jaws 10 is in the closed configuration, the contact surface—contact through the tube 5—between the two jaws is directed substantially along a line I (i.e. substantially linear) in a transverse direction relative to the longitudinal direction of the packaging tube 5, as illustrated in FIG. 4.

Furthermore, each jaw of said lower pair of jaws 11 comprises a surface of contact with the packaging tube 5 which is cylindrical as can be seen in FIG. 4 or 5, and disposed such that when said pair of jaws 11 is in the closed configuration, both jaws form a closed cylinder 13 around said packaging tube 5, said cylinder having substantially that diameter of the packaging tube 5.

The storing unit 2 is a closed chamber comprising temperature-regulated freezing means for storing said product at a temperature comprised between −5° C. and −35° C., preferably a temperature comprised between −15° C. and −25° C., and more preferably a temperature of −18° C. More particularly, the storing unit is composed of a cooling/freezing system comprising a compressor coupled to an evaporator, a condenser, and all other parts necessary to ensure the cooling process.

The viscosity of the product is as follows:

| Measured value on soft ice cream without overrun (20% instead of 190% N2O) | | | |
| --- | --- | --- | --- |
| Temperature | Viscosity centipose (cps) | Yield stress (pa) | Complex viscosity eta* (Pa · s) (after 10% deformation) |
| Mix at +4° C. | 180-200 | | |
| r72 at −15° C. | | 246 | 740 |
| r72 at −20° C. | | 397 | 1690 |
| r72 at −25° C. | | 884 | 6620 |

1000 centipoise = 1 pascal · s

The frame and walls of the dispensing device 1 according to the present invention are insulated so as to keep the internal temperature inside the dispensing device as constant as possible. Any material known in the art of heat insulation for electrical appliances can be used. Preferably, the dispensing device according to the present invention has dimensions and external shape such that it can easily be placed on a table, for "at-home" dispensing.

The dispensing device 1 further comprises a storage unit to store one or several cups or cones (not shown in the drawing) corresponding each to one portion of product to be dispensed. Cones can be edible or not. The storage system further comprises a system for transferring one cup at a time under the dispensing opening of the flexible packaging tube, each time the device is operated to dispense a portion of product. Alternatively, the cups in the storage area of the dispensing device are accessible to the consumer who can take one cup directly from the said storage area and place it under the dispensing opening of the flexible tube, prior to actuating the dispensing process of the device.

In a highly preferred embodiment of the invention, the dispensing area 14 of the dispensing device 1 comprises the dispensing opening 7 (or dispensing spout) of the flexible packaging tube 5 and a plate 15 for holding the cup 16 (or cone) to be filled with product 3.

The dispensing area 14 is kept closed from outside of the dispensing device 1, by a door 17 (or a shutter, or similar), so as to keep the temperature inside the dispensing device 1 as close to the target cooling/freezing temperature (eg.−18° C.) as possible.

The said door or shutter 17 can be open and reclosed manually by the consumer when a portion of product 3 is ready. It can be opened as a pivoting hinged door.

Optionally, the dispensing device 1 of the invention can comprise a coin system—not shown in the drawing—so that consumers can operate the device and get a portion of product by inserting coins into a payment module coupled to the electronic control unit.

In another aspect, the present invention is also directed to a package 5 for a storing and dispensing a viscous edible product 3, that is suitable for being stored in a coiled manner in the storing unit 2 of a dispensing system 1 according to the above description.

According to the present invention, the package 5 is a flexible tube made of food-grade material, as illustrated in FIG. 1.

As can be seen in FIG. 1, and even more precisely in FIG. 2, the packaging tube 5 according to the present invention comprises a rigid spout 18 onto which the dispensing end of said tube 5 is connected.

The rigid spout 18 is disposed within the packaging tube 5, and comprises an elongated rigid tube portion that can be seen in FIG. 5 when the flexible packaging tube is deformed by the compression means 8. The emptied portion of the packaging tube is stored after dispensing around this elongated rigid tubular portion 19, abutting a fixed rim 20 of the spout 18. The length of the rigid tubular portion 19 of the spout 18 that is used as a storing system for the emptied length of packaging tube 5, can vary and is comprised between 1 and 40 cm.

The length of the flexible packaging tube 5 is comprised between 0.5 and 20 meters.

In a highly preferred embodiment of the present invention, the package 5 is a one-use disposable package suitable for being removably stored into the dispensing unit 4 of the dispensing device.

In another aspect, the present invention is further directed to a method of dispensing a viscous food product from a dispensing device having features as above described, comprising the steps of, in order:
  providing said viscous food product in a flexible packaging tube according to the aforementioned characteristics,
  placing the dispensing extremity 7 of said flexible packaging tube 5, such that a substantially linear portion of said tube is created adjacent the dispensing opening 7, that is positioned between upper 10 and lower 11 jaws of the compression means 8,
  actuating the compression means so that:
  the upper 10 and lower 11 pairs of jaws move in a perpendicular direction relative to the longitudinal axis of the packaging tube 5, so as to pinch said flexible packaging tube, and then
  said upper 10 and lower 11 pairs of jaws move in a parallel direction relative to the longitudinal axis of the packaging tube 5, so as to uncoil the packaging tube 5 from its portion that is coiled and stored in the storage unit 2 of the dispensing device 1, and so that the product 3 contained in the portion of the tube comprised between said upper pair of jaws 10 and the dispensing opening 7 of the tube, is pushed outside through said dispensing spout 18 and then through said dispensing opening 7, into a cup, cone or similar container disposed below as shown in FIG. 1,
  actuating said upper 10 and lower 11 pairs of jaws of the compression means 8, back into their initial position.

Preferably, said storing unit is a closed chamber comprising temperature-regulated freezing means for storing said product at a temperature comprised between −5° C. and −25° C.

Also preferably, the flexible tube package is stored in storing unit, in a coiled configuration.

Finally, it is preferable that the emptied portion of packaging tube is disposed after dispensing around a rigid tubular portion of a dispensing spout connected to the dispensing end of the tube.

In a preferred embodiment of the present invention, and alternatively to a fully manual operation of the dispensing device by the consumer, the dispensing device can comprise an electronic control unit that is pre-programmed to ensure automatic portioning control of the volume of product delivered from the packaging tube during each dispensing cycle.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A dispensing device for a viscous edible product, comprising a storing unit for storing the viscous product, and a dispensing unit, the dispensing unit comprises:
  at least one flexible packaging tube defining at least one cavity for storing and dispensing the food product, located within the dispensing unit such that it comprises a substantially linear portion adjacent its dispensing opening, the packaging tube comprising a rigid spout onto which a dispensing end of the packaging tube is connected;
  compression means comprising at least upper and lower pairs of jaws for pinching the linear portion of the tube, the compression means being movable in substantially perpendicular and parallel directions relative to the longitudinal axis of the tube, and
  actuation means for reversibly moving the compression means first in a direction substantially perpendicular to the longitudinal axis of the packaging tube to releasably pinch at least one portion of the flexible tube, and second in a direction parallel to the longitudinal axis of the tube towards its dispensing opening, so as to dispense at least one portion of the product stored in the tube, the rigid spout comprising an elongated rigid tubular portion around which an emptied portion of the tube is stored after dispensing.

2. A dispensing device according to claim 1, wherein each jaw of the upper pair of jaws comprises a surface of contact with the packaging tube which is cylindrical, and disposed such that when the pair of jaws is in a closed configuration, the contact surface between the two jaws is linear and directed substantially in a transverse direction relative to the longitudinal direction of the packaging tube.

3. A dispensing device according to claim 1, wherein each jaw of the lower pair of jaws comprises a surface of contact with the packaging tube which is cylindrical, and disposed such that when the pair of jaws is in a closed configuration, both jaws form a closed cylinder around the packaging tube, the cylinder having a diameter that is substantially the same as a diameter of the packaging tube.

4. A dispensing device according to claim 1, wherein the storing unit is a closed chamber comprising temperature-regulated freezing means for storing the product at a temperature of between −5° C. and −35° C.

5. A dispensing device according to claim 1, wherein the packaging tube is located within the storing unit of the dispensing device, in a coiled configuration.

6. A package for storing and dispensing a viscous edible product, the package comprising:
  a flexible tube made of food grade material; and
  a rigid spout onto which the dispensing end of the tube is connected, the rigid spout comprising an elongated rigid tube portion around which an emptied portion of the tube is stored after dispensing;
  the package suitable for storage in a storing unit of a dispensing system for the viscous edible product, the dispensing system comprising the storing unit for storing the viscous product, and a dispensing unit, the dispensing unit comprises: compression means comprising at least upper and lower pairs of jaws for pinching a linear portion of the tube, the compression means being movable in substantially perpendicular and parallel directions relative to the longitudinal axis of the tube, and actuation means for reversibly moving the compression means first in a direction substantially perpendicular to the longitudinal axis of the tube to releasably pinch at least one portion of the tube, and second in a direction parallel to the longitudinal axis of the tube towards its dispensing opening, so as to dispense at least one portion of the product stored in the tube.

7. A package according to claim 6, wherein a length of the package is between 0.5 and 20 meters.

8. A package according to claim 6, wherein the package is a one-use disposable package suitable for being removably stored in the dispensing unit of the dispensing device.

9. A method of dispensing a viscous food product from a dispensing device comprising compression means comprising upper and lower pairs of jaws, the method comprising the steps of:
providing a viscous food product in a flexible packaging tube comprising a rigid spout onto which a dispensing end of the packaging tube is connected;
placing a dispensing extremity of the flexible packaging tube in a dispensing device, such that a portion of the tube is positioned between the upper and lower jaws in a substantially linear position adjacent a dispensing opening of the tube;
actuating the compression means so that:
the upper and lower pairs of jaws move in a perpendicular direction relative to a longitudinal axis of the packaging tube, so as to pinch the flexible packaging tube, and then the upper and lower pairs of jaws move in a parallel direction relative to the longitudinal axis of the packaging tube, so that the product contained in the portion of the tube comprised between the upper pair of jaws and the dispensing opening of the tube is pushed outside through the dispensing opening,
moving the upper and lower pairs of jaws of the compression means back into their initial position, and
after dispensing, disposing of the emptied portion of the packaging tube around a rigid tubular portion of the rigid spout connected to the dispensing end of the tube.

10. A method according to claim 9, wherein the storing unit is a closed chamber comprising temperature-regulated freezing means for storing the product at a temperature comprised between −5° C. and −25° C.

11. A method according to claim 9, wherein the flexible tube package is stored in storing unit, in a coiled configuration.

12. A dispensing device for a viscous edible product, comprising a storing unit for storing the viscous product that comprises:
at least one flexible packaging tube defining at least one cavity for dispensing the food product, located within the dispensing unit such that it comprises a substantially linear portion adjacent its dispensing opening, the packaging tube comprising a rigid spout onto which a dispensing end of the packaging tube is connected; and
upper and lower pairs of jaws for pinching the linear portion of tube, the jaws being movable in substantially perpendicular and parallel directions relative to the longitudinal axis of the tube, the jaws being moved in a direction substantially perpendicular to the longitudinal axis of the packaging tube to releasably pinch at least one portion of the flexible tube, and in a direction parallel to the longitudinal axis of the tube towards its dispensing opening, so as to dispense at least one portion of the product packed in the tube, the rigid spout comprising an elongated rigid tubular portion around which an emptied portion of the tube is stored after dispensing.

13. A dispensing device according to claim 12, wherein each jaw of the lower pair of jaws comprises a surface of contact with the packaging tube that is cylindrical and disposed such that, when the lower pair of jaws is in a closed configuration, both of the lower pair of jaws form a closed cylinder around all sides of the packaging tube.

14. A dispensing device according to claim 1, wherein the rigid tubular portion is disposed within the tube.

15. A package according to claim 6, wherein each jaw of the lower pair of jaws comprises a surface of contact with the packaging tube that is cylindrical and disposed such that, when the lower pair of jaws is in a closed configuration, both of the lower pair of jaws form a closed cylinder around all sides of the packaging tube.

16. A method according to claim 9, wherein each jaw of the lower pair of jaws comprises a surface of contact with the packaging tube that is cylindrical and disposed such that, when the lower pair of jaws is in a closed configuration, both of the lower pair of jaws form a closed cylinder around all sides of the packaging tube.

\* \* \* \* \*